(12) United States Patent
Chuang et al.

(10) Patent No.: US 10,434,977 B2
(45) Date of Patent: Oct. 8, 2019

(54) SEATBELT ANCHOR

(71) Applicant: Ford Global Technologies, LLC, Dearborn, MI (US)

(72) Inventors: Ching-Hung Chuang, Northville, MI (US); Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/692,888

(22) Filed: Aug. 31, 2017

(65) Prior Publication Data

US 2019/0061682 A1 Feb. 28, 2019

(51) Int. Cl.
| | |
|---|---|
| *B60R 22/38* | (2006.01) |
| *B60R 22/24* | (2006.01) |
| *B60R 22/28* | (2006.01) |
| *B60R 22/34* | (2006.01) |

(52) U.S. Cl.
CPC ............. *B60R 22/24* (2013.01); *B60R 22/28* (2013.01); *B60R 22/34* (2013.01); *B60R 2022/286* (2013.01)

(58) Field of Classification Search
CPC .......... B60R 22/24; B60R 22/28; B60R 22/34
See application file for complete search history.

(56) References Cited

U.S. PATENT DOCUMENTS

| | | | | |
|---|---|---|---|---|
| 5,513,880 | A * | 5/1996 | Ohira ...................... | B60R 22/24 280/808 |
| 5,732,974 | A * | 3/1998 | Sayles ..................... | B60R 22/18 280/805 |
| 6,273,469 | B1 * | 8/2001 | Kwaske ................ | B60R 21/055 280/805 |
| 6,502,861 | B2 * | 1/2003 | Specht .................... | H04L 9/083 24/97 |
| 6,641,222 | B2 * | 11/2003 | Specht .................... | B60R 22/24 280/801.1 |
| 6,860,671 | B2 | 3/2005 | Schulz | |
| 8,870,225 | B2 | 10/2014 | Han | |
| 8,944,468 | B2 * | 2/2015 | Cox ................... | A44B 11/2561 280/801.1 |
| 9,090,225 | B2 * | 7/2015 | Rouhana ................. | B60R 22/28 |
| 10,064,452 | B1 * | 9/2018 | Faruque ............. | A44B 11/2561 |

(Continued)

FOREIGN PATENT DOCUMENTS

| | | |
|---|---|---|
| CN | 202481026 U | 10/2012 |
| CN | 204432597 U | 7/2015 |

(Continued)

*Primary Examiner* — James A English
(74) *Attorney, Agent, or Firm* — Frank MacKenzie; Bejin Bieneman PLC (57) ABSTRACT

A seatbelt anchor includes an attachment portion. The seatbelt anchor includes a seatbelt support portion spaced from the attachment portion to define a slot therebetween. The seatbelt anchor includes a pair of connecting portions spaced from each other with the slot disposed therebetween and connecting the attachment portion to the seatbelt support portion and including a lattice structure that is plastically deformable relative to the attachment portion and the seatbelt support portion.

20 Claims, 7 Drawing Sheets

(56) References Cited

U.S. PATENT DOCUMENTS

| | | | | |
|---|---|---|---|---|
| 2007/0138783 A1* | 6/2007 | Gleason | ............... | B60R 22/24 |
| | | | | 280/808 |
| 2009/0295138 A1* | 12/2009 | Cox | ............... | A44B 11/2546 |
| | | | | 280/801.1 |
| 2010/0180409 A1* | 7/2010 | Ito | ............... | A44B 11/2561 |
| | | | | 24/593.1 |
| 2013/0240662 A1* | 9/2013 | Ito | ............... | B60R 22/24 |
| | | | | 242/615.3 |
| 2017/0144623 A1* | 5/2017 | Cahill | ............... | B60R 22/28 |

FOREIGN PATENT DOCUMENTS

| KR | 20020017073 A | 3/2002 |
|---|---|---|
| WO | 0158727 A1 | 8/2001 |

* cited by examiner

SEATBELT ANCHOR

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

A seatbelt anchor includes an attachment portion. The seatbelt anchor includes a seatbelt support portion spaced from the attachment portion to define a slot therebetween. The seatbelt anchor includes a pair of connecting portions spaced from each other with the slot disposed therebetween and connecting the attachment portion to the seatbelt support portion and including a lattice structure that is plastically deformable relative to the attachment portion and the seatbelt support portion.

The lattice structure may have a negative Poisson's ratio.

The attachment portion may be formed of metal.

The slot may define an axial direction and the pair of connecting portions may be spaced from each in the axial direction.

The attachment portion may be spaced from the seatbelt support portion in a lateral direction, and the pair of connecting portions may be plastically deformable in the lateral direction.

The attachment portion may include a lattice structure.

The seatbelt support portion may include a lattice structure.

The pair of connecting portions may be formed of metal.

The pair of connecting portions may be 3D printed.

The attachment portion may be formed of a first material, and the seatbelt support portion may be formed of a second material that is different than the first material.

The seatbelt anchor may include an outer shell covering the attachment portion, the connecting portions, and the seatbelt support portion.

The seatbelt anchor may include a seatbelt positioning portion connected to the attachment portion.

The seatbelt positioning portion may include a lattice structure defining a first density, and the attachment portion may include a lattice structure defining a second density that is greater than the first density.

The seatbelt positioning portion may include a lattice structure defining a first density, and the seatbelt support portion may include a lattice structure defining a second density that is greater than the first density.

The seatbelt positioning portion may be of a first strength, and the attachment portion may be of a second strength that is greater than the first strength.

The seatbelt positioning portion may be of a first strength, and the seatbelt support portion may be of a second strength that is greater than the first strength.

The seatbelt positioning portion may extend from the attachment portion towards the seatbelt support portion.

A seatbelt assembly includes a retractor. The seatbelt assembly includes an anchor including an attachment portion, a seatbelt support portion spaced from the attachment portion to define a slot therebetween, and a pair of connecting portions spaced from each other with the slot disposed therebetween and connecting the attachment portion to the seatbelt support portion and including a lattice structure that is plastically deformable relative to the attachment portion and the seatbelt support portion. The seatbelt assembly includes a webbing payable from the retractor and slideably received in the slot.

The lattice structure may have a negative Poisson's ratio.

The pair of connecting portions may be 3D printed.

With reference to the Figures, a seatbelt anchor 20 for a seatbelt assembly 22 includes an attachment portion 24. The seatbelt anchor 20 includes a seatbelt support portion 26 spaced from the attachment portion 24 to define a slot 28 therebetween. The seatbelt anchor 20 includes a pair of connecting portions 30 spaced from each other with the slot 28 disposed therebetween and connecting the attachment portion 24 to the seatbelt support portion 26 and including a lattice structure that is plastically deformable relative to the attachment portion 24 and the seatbelt support portion 26.

Figure 3:
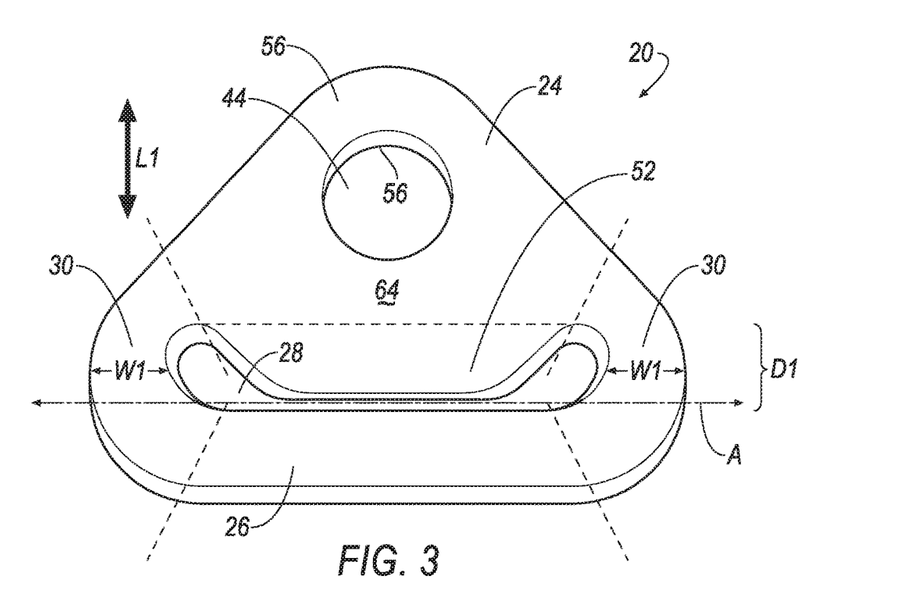
FIG. 3 is a perspective view of an example seatbelt anchor of the seatbelt assembly of FIG. 1.
Figure 4:
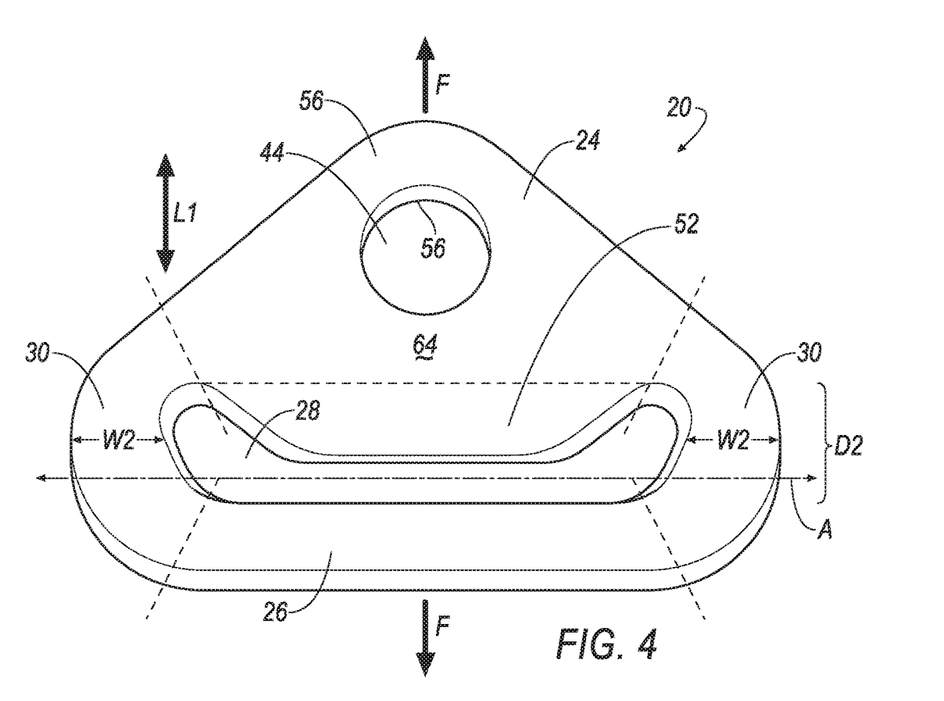
FIG. 4 is a perspective view of the example seatbelt anchor of FIG. 3 with an applied tensile force to a connecting portion and a resulting change of a length of the connecting portion.

The attachment portion 24, the seatbelt support portion 26, the connecting portions 30, and a seatbelt positioning portion 52 (discussed below) are shown in FIGS. 3 and 4 as separated by dashed lines. The portions 24, 26, 30, 52 may change immediately at the dotted lines, or can gradually change from one to another over the dotted lines.

The plastic deformation of the connection portion 30 relative to the attachment portion 24 and the seatbelt support portion 26 absorbs energy, thereby reducing force on an occupant 42 of a vehicle 36, e.g., during an impact to the vehicle 36.

Figure 1:
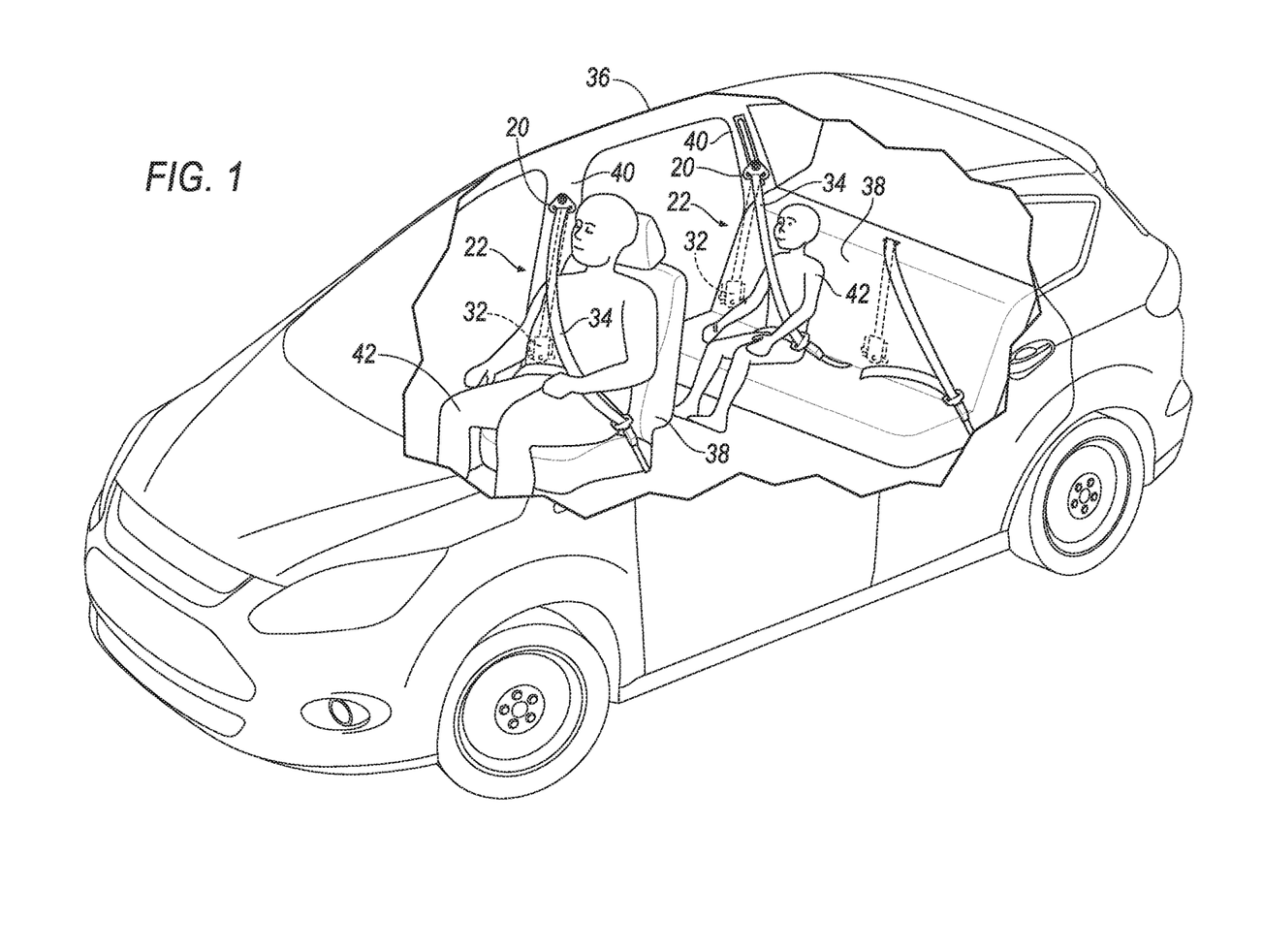
FIG. 1 is a perspective view of an example vehicle including multiple seatbelt assemblies.
Figure 2:
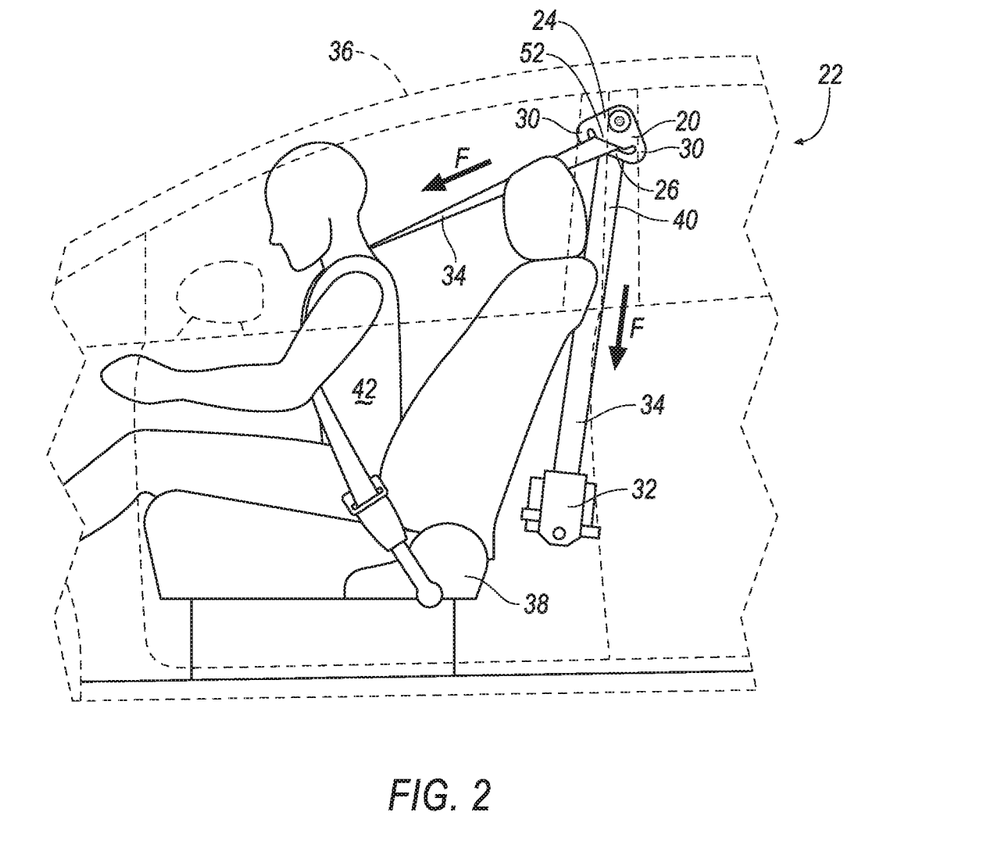
FIG. 2 is a side view of the example vehicle and one of the seatbelt assemblies during an impact to the vehicle.

The seatbelt assembly 22, shown in FIGS. 1 and 2, may include a retractor 32 and a webbing 34. The seatbelt assembly 22 may be a component of the vehicle 36. The vehicle 36 may be any passenger or commercial automobile such as a car, a truck, a sport utility vehicle, a crossover vehicle, a van, a minivan, a taxi, a bus, etc. The vehicle 36 may include the seatbelt assembly 22, one or more seats 38, one or more pillars 40, etc. During, e.g., a frontal and/or rear impact, the seatbelt assembly 22 restrains the occupant 42 of the seat 38 and/or limits a displacement of the occupant 42 relative to the seat 38.

The attachment portion 24, shown in FIGS. 2, 3, 4, and 9, secures the seatbelt anchor 20 to the vehicle 36. For example, the attachment portion 24 may include a hole 44, e.g., sized to receive a fastener. The fastener, e.g., a bolt, may secure the seatbelt anchor 20 to the vehicle 36, e.g., to one of the seats 38, one of the pillars 40, etc. The attachment portion 24 may be formed of metal.

The attachment portion 24 may include a lattice structure. The lattice structure, shown in FIGS. 5 through 8, may be a cellular structure that includes multiple interconnected cells 46, i.e., the lattice structure may include a repeating pattern of cells 46 connected to each other. Each cell may be, for example, 1-2 mm in all directions. In such an embodiment, the lattice structure may be monolithic, i.e., the cells 46 are connected to each other as a one-piece unit. The cells 46 may be integral with each other, i.e., the cells 46 are monolithic with no seams, joints, fasteners, or adhesives holding the cells together. As an example, the cells may be formed together simultaneously as a single continuous unit, e.g., by 3D printing, as discussed below.

The cells 46 may have any suitable geometric shapes, e.g., rectangular, hexagonal, pyramid, pentagonal, etc. In one example, the cells 46 may have similar dimensions and/or shape. For example, the cells 46 may be rectangular and have similar dimensions. Alternatively, some of the cells 46 may have dimensions and/or shapes different than other cells 46.

The cells 46 may each include strips 48 connected to each other and/or connected to strips 48 of adjacent cells 46. The strips 48 may define one of more voids 50 within the cell 46. When the lattice structure is subjected to a tensile force F exceeding a threshold, the strips 48 deform by bending and/or stretching such that the lattice structure elongates. The plastic deformation of the lattice structure may be designed based on the thickness and shape of the strips 48, a ratio of material of the strips 48 to the voids 50, etc. The ratio of strips 48 to voids 50 defines a volume fraction of the cells 46. The volume fraction may be based on dimensions of each cell, thickness of material pieces used to produce each cell, etc.

Various production techniques may be used to produce the lattice structure. For example, the lattice structure may be 3D printed. For example, the lattice structure can be 3D printed using Selective Laser Melting (SLM) techniques. SLM is a particular rapid prototyping technique, e.g., 3D printing, Additive Manufacturing (AM), etc., designed to use a high power-density laser to melt and fuse metallic powders together. Other 3D printing processes, techniques and materials may be used.

The lattice structure of the attachment portion 24 may define a density. The density of the lattice structure may be defined by the volume fraction of the cells 46, e.g., the greater the volume fraction, the greater the density. The density of the lattice structure may be defined by a number of strips 48 in a fixed volume of material, e.g., the greater the number of strips 48 in the fixed volume of material, the greater the density. In other words, the density of the lattice structure is the ratio of the strips 48 relative to the overall volume of the lattice structure including gaps between the strips 48. The density of the lattice structure of the attachment portion 24 may be greater than a density defined by a lattice structure of the seatbelt positioning portion 52 (discussed below).

The attachment portion 24 may have a strength. The greater the strength the greater the tensile force F required to deform and/or fracture the attachment portion 24. The strength of the attachment portion 24 may be based on the size and shape of the attachment portion 24, the material of the attachment portion 24, the lattice structure of the attachment portion 24, etc.

The seatbelt support portion 26 supports the webbing 34. For example, during the impact to the vehicle 36 the occupant 42 applies the tensile force F to the webbing 34, as shown in FIG. 2. The tensile force F on the webbing 34 is transferred to the seatbelt anchor 20 via the seatbelt support portion 26.

The seatbelt support portion 26 may be formed of metal, as described above for the attachment portion 24. The seatbelt support portion 26 may be 3D printed, as described above for the attachment portion 24. The seatbelt support portion 26 may include a lattice structure that defines a density, as described above for the attachment portion 24. The seatbelt support portion 26 may have strength, as described above for the attachment portion 24. The seatbelt support portion 26 may be formed of a material that is different than the material that forms the attachment portion 24. For example, the density of the lattice structure of the seatbelt support portion 26 may be different than the density of the lattice structure of the attachment portion 24.

The seatbelt support portion 26, shown in FIGS. 2, 3, 4, and 9, is spaced from the attachment portion 24 to define the slot 28 therebetween. The slot 28 provides an opening extending from a front surface 54 of the seatbelt anchor 20 to a rear surface 56 of the seatbelt anchor 20. The slot 28 defines an axial direction A, e.g., extending along a length of the slot 28.

The attachment portion 24 may be spaced from the seatbelt support portion 26 in a lateral direction L1. The lateral direction L1 may be perpendicular to the axial direction A.

The pair of connecting portions 30, shown in FIGS. 2, 3, 4, and 9, connect the attachment portion 24 to the seatbelt support portion 26. The pair of connecting portions 30 may be spaced from each other with the slot 28 disposed therebetween. For example, the connecting portions 30 may be spaced from each other in the axial direction A.

The pair of connecting portions 30 may be formed of metal. The pair of connecting portions 30 may be 3D printed, as described above for the attachment portion 24. The connecting portions 30 may include a lattice structure, as described above for the attachment portion 24.

The lattice structure of the connecting portions 30 is plastically deformable relative to the attachment portion 24 and the seatbelt support portion 26. To put it another way, application of the tensile force F to the seatbelt anchor 20, such as that applied to the seatbelt support portion 26 by the webbing 34 during the impact to the vehicle 36, causes the connecting portions 30 to plasticly deform by a greater amount than the attachment portion 24 and the seatbelt support portion 26. For example, application of the tensile force F may cause the connecting portions 30 to plasticly deform while the attachment portion 24 and the seatbelt support portion 26 do not deform. During this plastic deformation, a length of the connecting portions 30, e.g., between the attachment portion 24 and the seatbelt support portion 26, increases to relieve force applied to a torso of the occupant 42, e.g., to reduce chest compression and/or abdominal compression, caused by inertia of the occupant 42 being restrained by the webbing 34 during the vehicle 36 impact.

Plastic deformation, in the context of present disclosure, is a deformation of a solid material undergoing irreversible changes of its shape in response to applied forces. For example, the connecting portions 30 may plastically deform when the tensile force F, e.g., caused during the vehicle 36 impact, exceeds a threshold. When the tensile force F exceeds the threshold, the connecting portions 30 plastically deform. The threshold at which the tensile force F plastically deforms the lattice structure of the connecting portions 30 may be defined based on the size, shape, material, etc., of the connecting portions 30. For example, the threshold at which the tensile force F plastically deforms the lattice structure of the connecting portions 30 may be defined based on the dimensions of cells 46 of the lattice structure, the shape of the cells 46 of the lattice structure, the volume fraction of the lattice structure, etc. The characteristics of the connecting portions 30 and the characteristics of the lattice structure of the connecting portions 30 may be selected based on the threshold at which the tensile force F plastically deforms the lattice structure, an estimated weight of the occupant 42, estimated deceleration forces of the vehicle 36 during impact, etc.

The pair of connecting portions 30 are plastically deformable in the lateral direction L1. For example, the lattice structure of the connecting portions 30 may be aligned to provided plastic deformation in the lateral direction L1. For example, opposite ends 58 of a bow-tie lattice structure 60 (discussed below) may be spaced from each other in the lateral direction L1.

The deformation of the connecting portions 30 in the lateral direction may be relative to the attachment portion 24 and the seatbelt support portion 26. For example, the connecting portions 30 may be designed to plastically deform when the tensile force F is applied to the seatbelt anchor 20 in the lateral direction L1, and the attachment portion 24 and the seatbelt support portion 26 may be designed to not deform when the tensile force F is applied to the seatbelt anchor 20, e.g., the connecting portions 30 may have a lower strength, less dense lattice structure, etc., as compared to the attachment portion 24 and the seatbelt support portion 26.

The connecting portions 30 may have an original length D1, as shown in FIG. 3. The original length D1, in the present context, refers to a length of the connecting portions 30 prior to deformation, e.g., stretching due to the tensile force F. The length of the connecting portions 30 may elongate as the connecting portions 30 plastically deform relative to the to the attachment portion 24 and the seatbelt support portion 26. In other words, the connecting portions 30 may stretch from the original length D1 to an extended length D2, shown in FIG. 4, after undergoing plastic deformation. For example, the original length D1 may be, for example, 3 centimeters, and in response to the tensile force F exceeding the threshold, e.g., caused by the vehicle impact, the connecting portions 30 may deform to the extended length D2, for example 4 centimeters.

The lattice structure of the connecting portions 30 may have a negative Poisson's ratio (NPR). In other words, the lattice structure of the connecting portions 30 expands in a direction transverse to a direction of applied tension. To put it another way, the material becomes wider when stretched.

For example, each connecting portion 30 may have an original width W1, as shown in FIG. 3. The original width, in the present context, refers to a width of one of the connecting portions 30 prior to deformation, e.g., stretching due to the tensile force F. The width of the connecting portions 30 may enlarge as the connecting portions 30 plastically deform relative to the to the attachment portion 24 and the seatbelt support portion 26. In other words, the connecting portions 30 may stretch from the original width W1 to an extended length W2, shown in FIG. 4, after undergoing plastic deformation.

Figure 5:
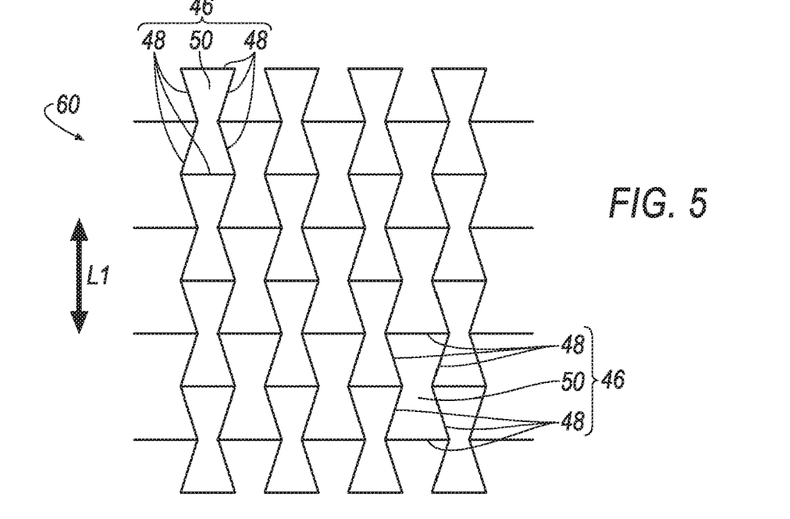
FIG. 5 is an illustration of an example lattice structure of the seatbelt anchor of FIG. 3 having a negative Poisson's ratio.
Figure 6:
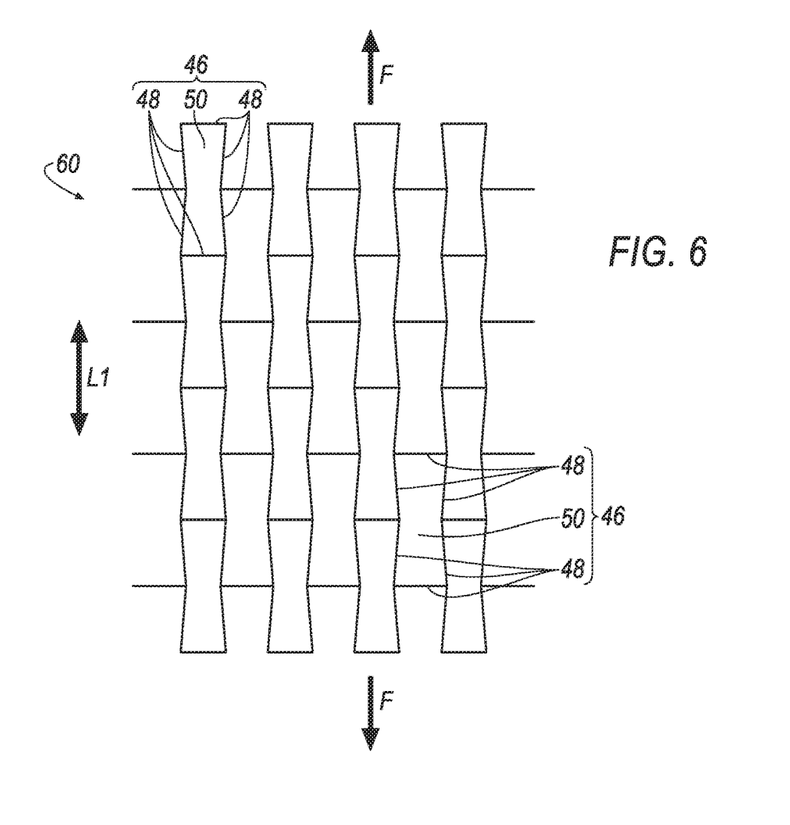
FIG. 6 is an illustration of the example lattice structure of FIG. 4 with an applied tensile force.
Figure 7:
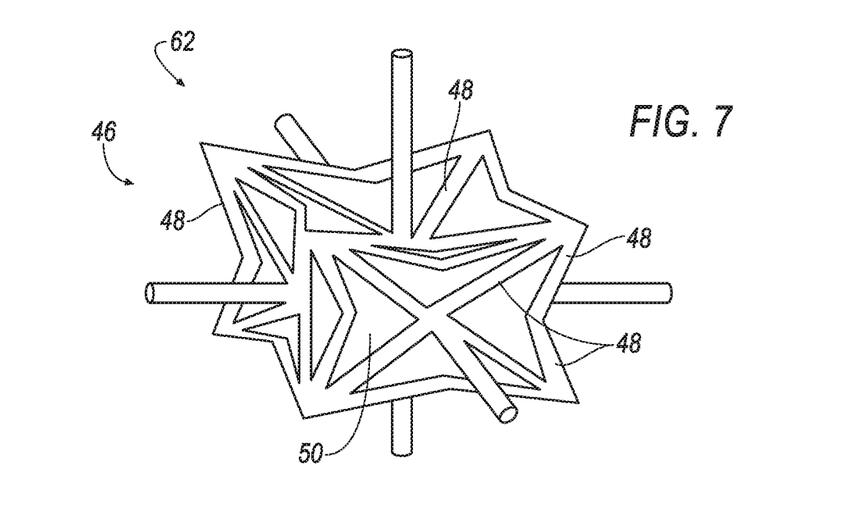
FIG. 7 is an illustration of a cell of another example lattice structure of the seatbelt anchor of FIG. 3 having a negative Poisson's ratio.
Figure 8:
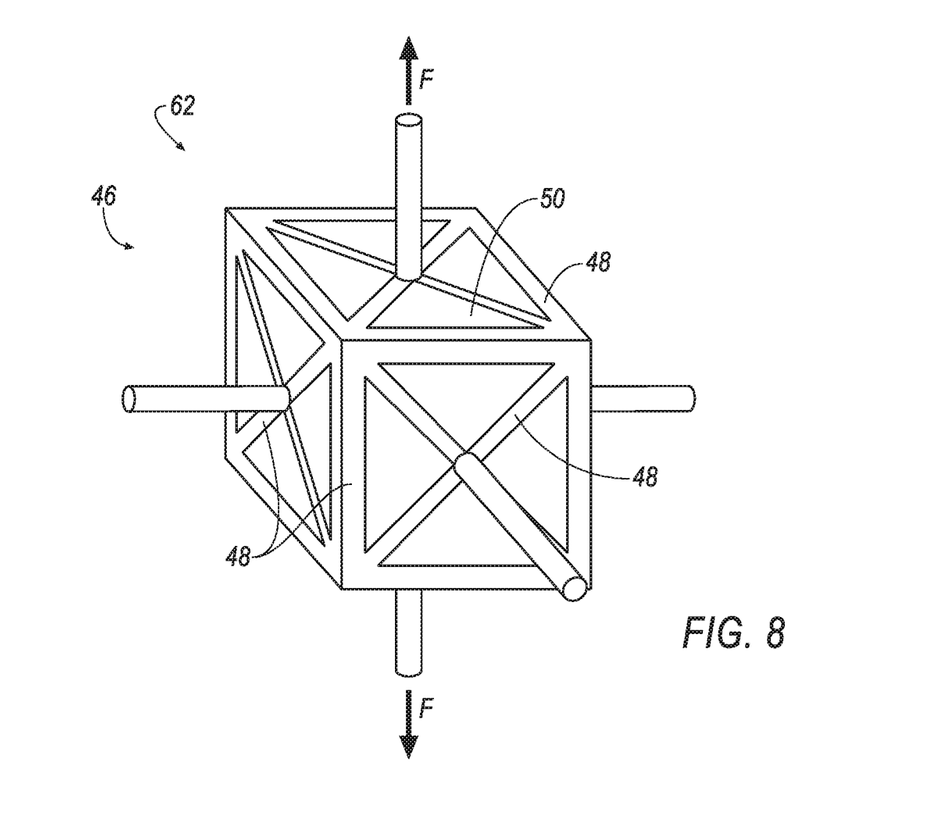
FIG. 8 is an illustration of the example cell of FIG. 7 with an applied tensile force.
Figure 9:
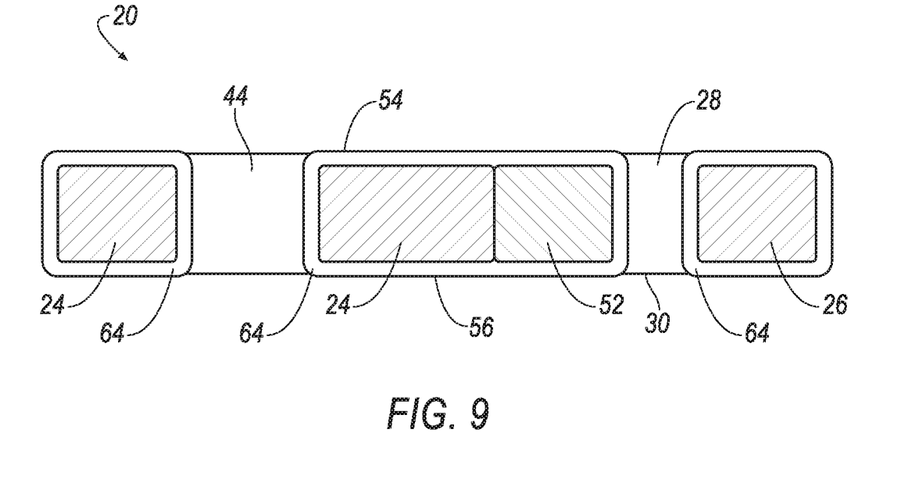
FIG. 9 is a side cross-section view of the seatbelt anchor of FIG. 3.

For example, the bow-tie lattice structure 60, shown in FIGS. 5 and 6, provides a NRP when the tensile force F is applied inline with the opposing ends 58 of the bow-tie lattice structure 60. Other NPR lattice structures, e.g., of the connecting portions 30, may be designed to unfold when the tensile force F is applied regardless of direction, for example a reentrant unit cell structure 62, shown in FIGS. 7 and 8. Unfolding of NPR structures absorbs energy, e.g., generated by the occupant 42 and applied to the webbing 34 during the vehicle 36 collision. Materials having a NPR lattice structure may be referred to as auxetic materials.

Figure 10:
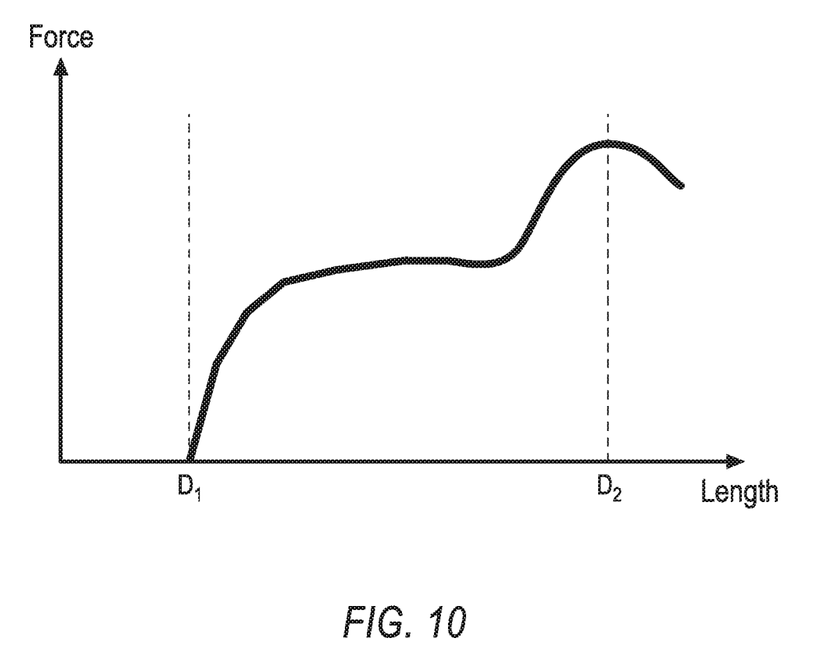
FIG. 10 is a graph depicting the tensile force applied to the connecting portion and the resulted change of the length of the connecting portion.

FIG. 10 illustrates a graph including the tensile force F and the length of the connecting portions 30. The connecting portions 30 may have the original length D1. In response to the application of the tensile force F that exceeds the threshold, the connecting portions 30 deform to the extended length D2. In the example shown in FIG. 10, the lattice structure has the negative Poisson's ratio. In this case, the length of the connecting portions 30 increases as the lattice structure plastically deforms. As the length of the connecting portions 30 increases, the required force for plastic deformation dips before again rising as the connecting portions 30 stretch to the extended length D2, due to the negative Poisson's ratio of the lattice structure.

The seatbelt anchor 20 may include the seatbelt positioning portion 52, shown in FIGS. 2, 3, 4, and 9. The seatbelt positioning portion 52 positions the webbing 34 within the slot 28, e.g., narrows the slot 28 to inhibit the webbing 34 from folding, rolling, etc., therein. The seatbelt positioning portion 52 may be connected to the attachment portion 24. The seatbelt positioning portion 52 may extend from the attachment portion 24 towards the seatbelt support portion 26. For example, the seatbelt positioning portion 52 may extend from the attachment portion 24 into the slot 28.

The seatbelt positioning portion 52 may be formed of metal. The seatbelt positioning portion 52 may include a lattice structure that defines a density, as described above for the attachment portion 24. The density of the lattice structure of the seatbelt positioning portion 52 may be less than the density of the lattice structure of the attachment portion 24 and/or the density of the lattice structure of the seatbelt support portion 26. To put it another way, the density of the lattice structure of the attachment portion 24 and/or the density of the lattice structure of the seatbelt support portion 26 may be greater than the density of the lattice structure of the seatbelt positioning portion 52.

The seatbelt positioning portion 52 may have a strength, as described above for the attachment portion 24. The strength of the seatbelt positioning portion 52 may be less than the strength of the attachment portion 24 and/or the strength of the seatbelt support portion 26. To put it another way, the strength of the attachment portion 24 and/or the strength of the seatbelt support portion 26 may be greater than the strength of the seatbelt positioning portion 52.

The attachment portion 24, the seatbelt support portion 26, the connecting portions 30, and/or the seatbelt positioning portion 52 may be formed of a same type of material, e.g., a same type of metal, and may have the same lattice structure, etc. The attachment portion 24, the seatbelt support portion 26, the connecting portions 30, and/or the seatbelt positioning portion 52 may be formed of different types of material, e.g., different types of metal, and may have different lattice structures, etc. The attachment portion 24, the seatbelt support portion 26, the connecting portions 30, and/or the seatbelt positioning portion 52 may be formed with a combination thereof, e.g., the attachment portion 24 and the seatbelt support portion 26 may be formed of a same type of material, the connecting portions 30 may be formed of a material that is different than the attachment portion 24 and the seatbelt support portion 26, and the seatbelt positioning portion 52 may be formed of a material that is different than the connecting portions 30, the attachment portion 24, and the seatbelt support portion 26.

The attachment portion 24, the seatbelt support portion 26, the connecting portions 30, and/or the seatbelt positioning portion 52 may be integral, i.e., monolithic with no seams, joints, fasteners, or adhesives holding the portions 24, 26, 30 together. As an example, the attachment portion 24, the seatbelt support portion 26, the connecting portions 30, and/or the seatbelt positioning portion 52 may be formed in a single 3D printing operation, etc. In alternative to being integral, the attachment portion 24, the seatbelt support portion 26, the connecting portions 30, and/or the seatbelt positioning portion 52 may be formed separately and subsequently joined. For example, the attachment portion 24, the seatbelt support portion 26, the connecting portions 30, and/or the seatbelt positioning portion 52 may be formed separately and subsequently joined by fusing, laser welding, etc.

The seatbelt anchor 20 may include an outer shell 64 covering the attachment portion 24, the connecting portions 30, the seatbelt support portion 26, and/or seatbelt positioning portion 52. The outer shell 64 may be a polymer, e.g., a nylon, acrylonitrile butadiene styrene (ABS), vinyl, etc. The outer shell 64 presents a uniform appearance of the seatbelt anchor 20, i.e., the attachment portion 24, the seatbelt support portion 26, the connecting portions 30, and/or the seatbelt positioning portion 52 may look as one integrated piece rather than a multi-section component. In one example, when the connecting portions 30 deform (elongate), the surface of the outer shell 64 may fracture.

The seatbelt retractor 32 may be attached to a component of the vehicle 36, e.g. to one of the pillars 40, to one of the seats 38, etc. The seatbelt retractor 32 may be attached in any suitable manner, e.g., with one or more fasteners, etc. The seatbelt retractor 32 may include a spool. The spool may freely rotate within the retractor 32. The spool may be adapted to receive the webbing 34, for example, by including a webbing attachment slot and permitting the webbing 34 to wind around the spool. The seatbelt retractor 32 may include a locking mechanism that inhibits rotation of the spool when the vehicle 36 is subject to deceleration above a threshold amount, e.g., during the impact of the vehicle 36.

The webbing 34 may be formed of fabric in the shape of a strap. The webbing 34 may be attached to the spool, with the webbing 34 wound around the spool. The webbing 34 may be payable from the retractor 32, e.g., when the spool is not prevented from rotating by the locking mechanism. The webbing 34 may be slideably received in the slot 28. For example, the slot 28 may extend in the axial direction A by a distance that is greater than a width of the webbing 34, and the slot 28 may extend in the lateral direction L1 by a distance that is greater than a thickness of the webbing 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt anchor comprising:
an attachment portion;
a seatbelt support portion spaced from the attachment portion to define a slot therebetween; and
a pair of connecting portions spaced from each other with the slot disposed therebetween and connecting the attachment portion to the seatbelt support portion and including a lattice structure that is plastically deformable relative to the attachment portion and the seatbelt support portion, the lattice structure including interconnected cells having strips that define voids within the cells.

2. The seatbelt anchor of claim 1, wherein the lattice structure has a negative Poisson's ratio.

3. The seatbelt anchor of claim 1, wherein the attachment portion is formed of metal.

4. The seatbelt anchor of claim 1, wherein the slot defines an axial direction and the pair of connecting portions are spaced from each in the axial direction.

5. The seatbelt anchor of claim 1, wherein the attachment portion is spaced from the seatbelt support portion in a lateral direction, and the pair of connecting portions are plastically deformable in the lateral direction.

6. The seatbelt anchor of claim 1, wherein the attachment portion includes a lattice structure.

7. The seatbelt anchor of claim 1, wherein the seatbelt support portion includes a lattice structure.

8. The seatbelt anchor of claim 1, wherein the pair of connecting portions are formed of metal.

9. The seatbelt anchor of claim 1, wherein the pair of connecting portions are 3D printed.

10. The seatbelt anchor of claim 1, wherein the attachment portion is formed of a first material, and the seatbelt support portion is formed of a second material that is different than the first material.

11. The seatbelt anchor of claim 1, further comprising an outer shell covering the attachment portion, the connecting portions, and the seatbelt support portion.

12. The seatbelt anchor of claim 1, further comprising a seatbelt positioning portion connected to the attachment portion.

13. The seatbelt anchor of claim 12, wherein the seatbelt positioning portion includes a lattice structure defining a first density, and the attachment portion includes a lattice structure defining a second density that is greater than the first density.

14. The seatbelt anchor of claim 12, wherein the seatbelt positioning portion includes a lattice structure defining a first density, and the seatbelt support portion includes a lattice structure defining a second density that is greater than the first density.

15. The seatbelt anchor of claim 12, wherein the seatbelt positioning portion is of a first strength, and the attachment portion is of a second strength that is greater than the first strength.

16. The seatbelt anchor of claim 12, wherein the seatbelt positioning portion is of a first strength, and the seatbelt support portion is of a second strength that is greater than the first strength.

17. The seatbelt anchor of claim 12, wherein the seatbelt positioning portion extends from the attachment portion towards the seatbelt support portion.

18. A seatbelt assembly comprising:
a retractor;
an anchor including an attachment portion, a seatbelt support portion spaced from the attachment portion to define a slot therebetween, and a pair of connecting portions spaced from each other with the slot disposed therebetween and connecting the attachment portion to the seatbelt support portion and including a lattice structure that is plastically deformable relative to the attachment portion and the seatbelt support portion, the lattice structure including interconnected cells having strips that define voids within the cells; and a webbing payable from the retractor and slideably received in the slot.

19. The seatbelt assembly of claim 18, wherein lattice structure has a negative Poisson's ratio.

20. The seatbelt assembly of claim 18, wherein the pair of connecting portions are 3D printed.

* * * * *